United States Patent [19]

Chapuis et al.

[11] Patent Number: 4,622,588
[45] Date of Patent: Nov. 11, 1986

[54] METHOD FOR GENERATING A VIDEO IMAGE COMPRISING A GEOMETRICAL FIGURE AND A SHAPE GENERATOR FOR CARRYING OUT SAID METHOD

[75] Inventors: Franck Chapuis, Rennes; Guy Urbain, Argenteuil; Gilles Baubrand, Bois-Colombes, all of France

[73] Assignee: Thomson CSF, Paris, France

[21] Appl. No.: 607,705

[22] Filed: May 7, 1984

[30] Foreign Application Priority Data

May 11, 1983 [FR] France ................ 83 07903

[51] Int. Cl.[4] ................................ H04N 5/262
[52] U.S. Cl. ................... 358/183; 358/22; 358/185; 364/715
[58] Field of Search ............ 358/183, 185, 22, 160, 358/209; 364/715, 718

[56] References Cited

U.S. PATENT DOCUMENTS 3,821,468  6/1974  Busch ................ 358/183
4,432,009  2/1984  Reitmeier ............. 358/22

FOREIGN PATENT DOCUMENTS 2317836  7/1975  France .

OTHER PUBLICATIONS

Digital Circle-Pattern Generator for TV, by P. Lappalainen, IEEE Transactions on Broadcasting, vol. BC-19, No. 3, Dept. 1973, pp. 63-67.

Primary Examiner—Tommy P. Chin
Attorney, Agent, or Firm—Cushman, Darby & Cushman

[57] ABSTRACT

A generator for generating shapes derived from a square comprises a memory for storing the values of the function $|X|$ and a memory for storing the values of the function $|Y|$, an adder for delivering a value $M=|X|+|Y|$, and a memory for delivering control signals to a video switcher as a function of the value of M. In the case of points located inside a square corresponding to the equation $|X|+|Y|=K$, the value of M is smaller than K. The address values X and Y are computed as a function of the coordinates of the point considered in the image to be generated and as a function of the geometrical transformations to be made in the figure in order to vary its shape and its position.

8 Claims, 20 Drawing Figures

METHOD FOR GENERATING A VIDEO IMAGE COMPRISING A GEOMETRICAL FIGURE AND A SHAPE GENERATOR FOR CARRYING OUT SAID METHOD

BACKGROUND OF THE INVENTION

1. Field of the Invention

This invention relates to special effects produced on video images.

2. Description of the Prior Art

Special effects of certain types consist in combining a first and a second image obtained from different sources in order to generate an image in which one portion is supplied by the first image and in which another portion is supplied by the second image. In order to produce this effect, it is the customary practice to employ a device known as an electronic shape generator. When associated with a device designated as a variable-gain switcher, this generator serves to combine two video signals in order to obtain an image in which certain portions are provided by one of the video signals whilst the other portions are provided by the other video signal. For example, a shape generator associated with a variable-gain switcher permits the formation of an image having a background which is supplied by a first video signal and comprises an inset with blurred edges supplied by a second video signal. It is desirable to have the possibility of producing very different and variable shapes according to the requirements of users.

In order to generate the signals for controlling the switcher, conventional electronic shape generators comprise sawtooth-signal generators and parabolic signal generators. These signal generators can be either analog or digital generators. The analog generators have deficient time stability by reason of temperature variations, tolerances of components, aging, and so on. Digital generators are not subject to the problem of stability of adjustments and are easier to adjust. However, the shapes obtained are simple figures or patterns and it is particularly true to state that only a limited number of geometrical transformations can be carried out on these shapes. It is known, for example, to carry out a rotation of a square but not of a lozenge or of a star. It is also known to form blurred edges or colored borders, to perform a translational displacement or a multiplication of patterns but without any possibility of effecting a rotation at the same time.

The method in accordance with the invention makes it possible not only to generate a greater number of shapes but also permits transformation of these shapes by means of a translational displacement, an affine transformation, a movement of rotation, and an effect of perspective, which can be combined. This method also permits the formation of shapes by "modulating" a simple figure in a direction at right angles to its layout plane, independently of the directions of scanning of the image, which is not possible in the case of known devices.

SUMMARY OF THE INVENTION

A first object of the invention is to provide a method for generating a video image comprising a geometrical figure which can be represented in cartesian coordinates by an equation of the form H(X, Y)=constant, composed of one-dimensional functions. The method essentially consists:

in storing a table of values for each of the one-dimensional functions which compose the equation of the figure;

in causing a value of X and a value of Y to correspond to each point of the image to be generated;

in computing a value M=H(X, Y) for each point, as scanning of the image to be generated takes place, by reading in the tables the values of the functions which compose the equation;

in generating in respect of each image point a video signal which is a function of M whose value represents the location of the point either inside or outside the figure, depending on whether M is lower than or higher than the value established for the constant of the equation of the figure.

A second object of the invention is to provide an electronic shape-generating device for carrying out the method in accordance with the invention.

BRIEF DESCRIPTION OF THE DRAWINGS

Other features of the invention will be more apparent upon consideration of the following description and accompanying drawings, wherein.

DESCRIPTION OF THE PREFERRED EMBODIMENT

In a first example, the method in accordance with the invention is applied to the generation of a square, whereupon said square is transformed into a lozenge by an affine transformation, then displaced in a rotation and a translation. In a cartesian frame of reference, a square is defined by an equation of the form: $H(x, y) = |x| + |y| = $ constant, if the square is centered on the origin of the reference frame and if its diagonals coincide with the axes of the reference frame. In the case of any point located within the square, $H(x, y)$ is lower than the constant whereas, in the case of any external point, $H(x, y)$ is greater than the constant. The value of the constant therefore defines the size of the square.

In order to generate an image comprising a square, a knowledge of the function $H(x, y) = |x| + |y|$ is sufficient to define the shape of the square but its size and position remain to be defined.

In order to generate a video signal corresponding to the desired image, it is only necessary to determine in the case of each point, as the scanning operation proceeds, whether that point is or is not located within the square. The result of this determination permits the operation of a video signal switcher, for example.

If the points of the image to be generated are identified by coordinates (x, y) in the same reference frame as the frame employed for obtaining the equation $H(x, y) = $ constant, it is easy to determine whether a point is inside or outside the square by comparing the value of $H(x, y)$ at that point with the value of the constant which defines the size of the square. However, since the points are scanned in a fixed order, it is not possible to consider a single reference frame which moves when the square to be generated is displaced. It is for this reason that two reference frames are distinguished, namely a fixed frame and a movable frame.

Figure 1:
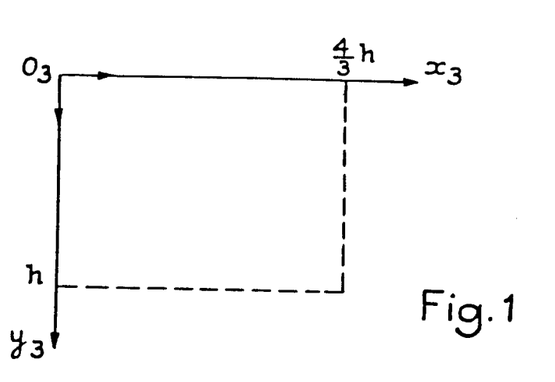
FIGS. 1 to 11 represent transformations carried out on one example of figure generated by the method in accordance with the invention.

There is shown in FIG. 1 a cartesian reference frame ($O_3$, $x_3$, $y_3$) designated as a fixed reference frame since it is related to the image which it is desired to obtain on a video screen. In a first step, the coordinates $x_3$ and $y_3$ correspond to a unit of length such as one millimeter, for example. In the case of a television image having a length equal to 4/3 of its width, the dashed line defines with the axes the edges of an image having a width h and a length 4/3 h. The only visible portion of the generated image will be the portion located within this rectangle.

Figure 2:
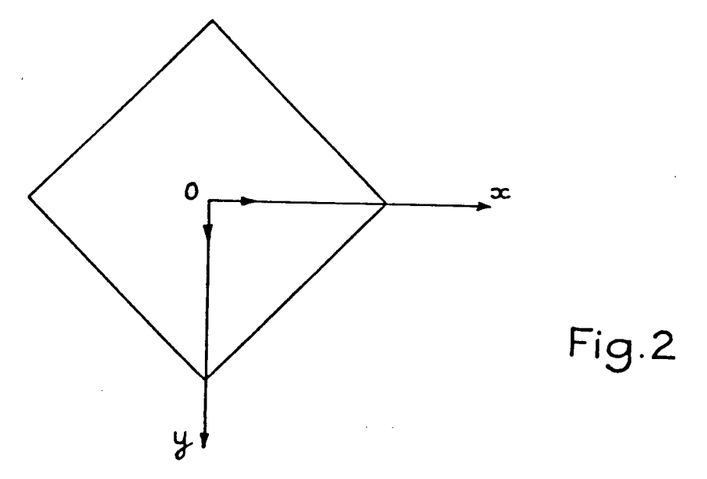

FIG. 2 represents a so-called initial image which is constituted by a square and from which the desired image will be deduced by means of geometrical transformations. The image obtained by means of these transformations will be designated hereinafter as a transformed image. The points of this initial image are identified in a cartesian frame of reference (O, x, y). In a first step, the units considered on these axes are units of length such as one millimeter. In this example, the origin O of the reference frame is located at the center of the frame and the axes coincide with the diagonals of the square.

Figure 3:
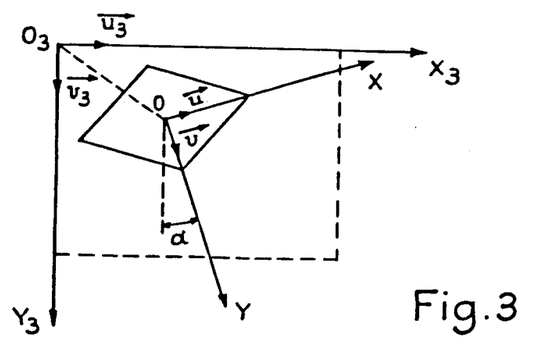

FIG. 3 represents the transformed image resulting from an initial-image transformation composed of a rotation through an angle $\alpha$ about the origin O of the movable reference frame, of an affine transformation having a ratio $A_x$ in the direction of the axis $\vec{Ox}$ and having a ratio $A_y$ in the direction of the axis $\vec{Oy}$, and of a translation defined by the vector $\vec{O_3O}$ which connects the origins of the two reference frames. The coordinates ($x_3$, $y_3$) and (x, y) are related in accordance with the following relation:

$$\begin{bmatrix} x_3 \\ y_3 \end{bmatrix} = \begin{bmatrix} A_x \\ A_y \end{bmatrix} \times \begin{bmatrix} \cos\alpha, & -\sin\alpha \\ \sin\alpha, & \cos\alpha \end{bmatrix} \times \left[ \begin{bmatrix} x \\ y \end{bmatrix} + \begin{bmatrix} x_{O3} \\ y_{O3} \end{bmatrix} \right] \quad (1)$$

($x_{O3}$, $y_{O3}$) are the coordinates of the origin $O_3$ in the movable reference frame defined earlier. The relation which is reverse to this latter serves to determine the coordinates (x, y) of a point of the initial image corresponding to a point having coordinates ($x_3$, $y_3$) of the transformed image:

$$x = \frac{\cos\alpha}{A_x}(x_3 - x_{O3}) + \frac{\sin\alpha}{A_x}(y_3 - y_{O3}) \quad (2)$$

$$y = -\frac{\sin\alpha}{A_y}(x_3 - x_{O3}) + \frac{\cos\alpha}{A_y}(y_3 - y_{O3})$$

In practice, identification of the points of the initial image and of the transformed image is not carried out with respect to a unit of length but with respect to the pitch of a grid since a digital television image is considered as made up of non-continuous rectangular elements usually designated as points. By way of example, a television image can be made up of 720 points per line and can comprise 576 lines per image.

In this example, the units of length in the fixed reference frame are accordingly as follows:

$$u_3 = \frac{4}{3} \times \frac{h}{720}$$

$$v_3 = \frac{h}{576}$$

The units of length of the movable reference frame as related to the initial image are modified in like manner. The values are the same as for the fixed reference frame if the initial image is any television image comprising 720 points per line and 576 lines per image. On the other hand, if the initial image is an image consisting of N points per line and comprising M lines per image, the units are in that case as follows:

$$u = \frac{4}{3} \times \frac{h}{N}$$

$$v = \frac{h}{M}$$

After these changes of units, the coordinates in the movable reference frame and in the fixed reference frame are designated respectively by the notations (X, Y) and ($X_3$, $Y_3$). Relation (2) becomes:

$$X = \frac{\cos\alpha}{A_x}(X_3 - X_{O3}) \cdot \frac{u_3}{u} + \frac{\sin\alpha}{A_x}(Y_3 - Y_{O3}) \cdot \frac{v_3}{v} \quad (3)$$

$$Y = -\frac{\sin\alpha}{A_y}(X_3 - X_{O3}) \cdot \frac{u_3}{u} + \frac{\cos\alpha}{A_y}(Y_3 - Y_{O3}) \cdot \frac{v_3}{v}$$

($X_{O3}$, $Y_{O3}$) are the coordinates of $O_3$ in the movable reference frame after the changes of units. Relation (3) can be written in the form:

$$\begin{bmatrix} X \\ Y \end{bmatrix} = \begin{bmatrix} I_{xx}, & Y_{xy} \\ I_{yx}, & I_{yy} \end{bmatrix} \begin{bmatrix} X_3 - X_{O3} \\ Y_3 - Y_{O3} \end{bmatrix} \quad (4)$$

where the coefficients $I_{xx}$, $I_{xy}$, $I_{yx}$, $I_{yy}$ are constant coefficients in the case of a given geometrical transformation.

The values of X and Y are constituted respectively by the rank of the point considered on its line and by the rank of its line in the initial image. In order to generate a video signal corresponding to the transformed image, a storage device is read at an address (X, Y) given by relation (4) at the instant at which the video signal corresponding to the point with coordinates ($X_3$, $Y_3$) of the transformed image is intended to be regenerated. The coordinates ($X_3$, $Y_3$) are constituted by the rank of this point on its line and by the rank of its line in the transformed image. Computation of the value of X and Y as a function of the value of $X_3$ and $Y_3$ by means of relation (4) is a very long procedure since it involves four multiplications. The method in accordance with the invention determines X and Y by means of a recurrence which permits a considerable reduction of the time required for computation. The method consists in computing a value of X and Y as a function of the value computed in the case of the immediately preceding point during scanning of the transformed image. The transition from one point having coordinates ($X_3-1$, $Y_3$) to the following point having coordinates ($X_3$, $Y_3$) is represented in accordance with relation (4) by a variation of X equal to $I_{xx}$ and by a variation Y equal to $I_{yx}$:

$$X(X_3, Y_3) = X(X_3-1, Y_3) + I_{xx}$$

$$Y(X_3, Y_3) = Y(X_3-1, Y_3) + I_{yx} \quad (5).$$

For each point of the transformed image, computation of the read address values in the storage device merely involves the need to add a constant increment $I_{xx}$ to the value of X computed in an immediately preceding step and in adding a constant increment $I_{yx}$ to the value of Y computed in an immediately preceding step.

At the beginning of each line of the transformed image, the value of X and of Y is computed in accordance with a relation which is no longer relation (4) but the following recurrence relation which is deduced therefrom:

$$X(O, Y_3) = X(O, Y_3-1) + I_{xy}$$

$$Y(O, Y_3) = Y(O, Y_3-1) + I_{yy} \quad (6).$$

And in the case of the first point of the first line of the transformed image, relation (4) gives the following values:

$$X(O, O) = -I_{xx} \cdot X_{O3} - I_{xy} \cdot Y_{O3}$$

$$Y(O, O) = -I_{YX} \cdot X_{O3} - I_{yy} \cdot Y_{O3} \quad (7).$$

Computation of the values X(O, O) and Y(O, O) involves four multiplications which take a long time. However, this is of no importance since this computation takes place only once per image and can be performed during the time interval which elapses between scanning of two successive images.

A more complex geometrical transformation can be composed not only of a rotation, of an affine transformation and of a translation but also of a projection which produces an effect of perspective. In this case, the points of the transformed image are identified in a cartesian reference frame (O$_3$, X$_3$, Y$_3$, Z$_3$), the plane of the video screen in which the transformed image is formed being the plane (O$_3$, X$_3$, Y$_3$). In order to produce an effect of perspective, each point of the initial image is projected on the plane (O$_3$, X$_3$, Y$_3$) along a straight line which passes through a point P$_F$ or so-called vanishing point.

Figure 4:
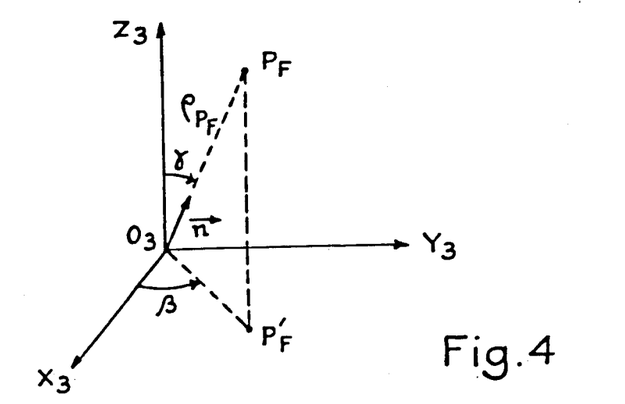

FIG. 4 represents the vanishing point P$_F$ in the reference frame (O$_3$, X$_3$, Y$_3$, Z$_3$) and has the following spherical coordinates:

$$\begin{bmatrix} \rho_{PF} \\ \beta = (\overrightarrow{O_3X_3}, \overrightarrow{O_3P'_F}) \\ \gamma = (\overrightarrow{O_3Z_3}, \overrightarrow{O_3P_F}) \end{bmatrix} \begin{array}{l} \text{such that } \overrightarrow{O_3P_F} = \rho_F \cdot \vec{n}, \text{ where } \vec{n} \\ \text{is a unit vector, where} \\ P'_F \text{ is the orthogonal} \\ \text{projection of } P_F \text{ on the} \\ \text{plane } (O_3, X_3, Y_3) \end{array} \quad (8)$$

The points of the initial image are located in a cartesian reference frame (O$_3$, X, Y, Z) or so-called movable reference frame whose axis $\overrightarrow{O_3Z}$ passes through the vanishing point P in the direction $\overrightarrow{O_3P_F}$.

Figure 5:
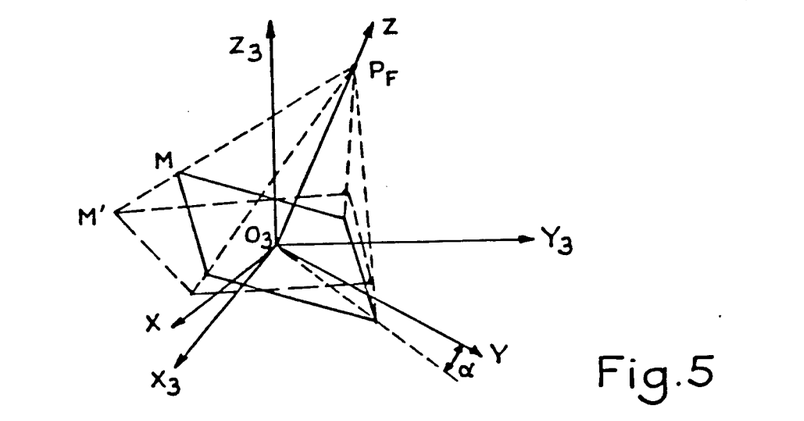

FIG. 5 shows the fixed reference frame, the movable reference frame, a geometrical figure in full lines and a geometrical figure in dashed lines. The initial image which is not shown in this figure consists of a square located in the plane O$_3$ X Y and centered at O$_3$. A rotation through an angle α about the point O$_3$ in the plane O$_3$ X Y and an affine transformation having coefficients (A$_x$, A$_y$, 1) are performed on the initial image. The transformed figure obtained as a result of these first transformations is constituted by the figure shown in full lines which is a lozenge whose diagonals have an angular displacement α with respect to the axes O$_3$X and O$_3$Y. Each point of the initial image having coordinates (X, Y, Z) in the movable reference frame O$_3$X, O$_3$Y, O$_3$Z has a transform in said reference frame consisting of a point with coordinates (X$_2$, Y$_2$, Z$_2$) which are given by the following formulae:

$$\begin{bmatrix} X_2 \\ Y_2 \\ Z_2 \end{bmatrix} = \begin{bmatrix} \cos\alpha & -\sin\alpha & 0 \\ \sin\alpha & -\cos\alpha & 1 \\ 0 & 0 & 1 \end{bmatrix} \begin{bmatrix} A_x & 0 & 0 \\ 0 & A_y & 0 \\ 0 & 0 & 1 \end{bmatrix} \begin{bmatrix} X \\ Y \\ Z \end{bmatrix} \quad (9)$$

Each point M of said lozenge having coordinates (X$_2$, Y$_2$, Z$_2$) is projected to a point M' in the direction M P$_F$ on the plane O$_3$X$_3$Y$_3$ in order to constitute a transformed image as represented in dashed outline in the figure. The center of the square of the initial image has not been modified by the rotation and affine transformation and is not modified by this projection but remains at the point O$_3$. It is worthy of note that some of the points of the lozenge are projected on a first face of the plane O$_3$X$_3$Y$_3$ whereas the other points are projected on the other face of said plane. The point M has the coordinates (X$_2$, Y$_2$, 0) in the movable reference frame and the coordinates (X$_1$, Y$_1$, Z$_1$) in the fixed reference frame, these coordinates being related in accordance with the following relation:

$$\begin{bmatrix} X_1 \\ Y_1 \\ Z_1 \end{bmatrix} = \begin{bmatrix} \cos\beta \cdot \cos\gamma, & -\sin\beta, & \sin\gamma \cdot \cos\beta \\ \cos\gamma \cdot \sin\beta, & \cos\beta, & \sin\gamma \cdot \sin\beta \\ -\sin\gamma, & 0, & \cos\gamma \end{bmatrix} \begin{bmatrix} X_2 \\ Y_2 \\ 0 \end{bmatrix} \quad (10)$$

Since the point M' is the projection of the point M in the direction MP$_F$, the vectors $\overrightarrow{P_FM}$ and $\overrightarrow{P_FM'}$ are collinear and are related in accordance with the following relation:

$$\overrightarrow{P_FM'} = k \cdot \overrightarrow{P_FM}$$

$$\overrightarrow{P_FO_3} + \overrightarrow{O_3M'} = k \cdot (\overrightarrow{P_FO_3} + \overrightarrow{O_3M'})$$

therefore $\overrightarrow{O_3M'} = \frac{1}{k} \cdot \overrightarrow{O_3M} - \frac{(1-k)}{k} \cdot \overrightarrow{O_3P_F} = \frac{1}{k} \cdot$ $$\overrightarrow{O_3M} - \frac{1-k}{k} \cdot \rho_{PF} \cdot \vec{n}$$

The coordinates of M and M' in the fixed reference frame are therefore related in accordance with the following relations:

$$X'_3 = \frac{X_1}{k} - \frac{1-k}{k} \cdot \rho_{PF} \cdot \sin\gamma \cdot \cos\beta \quad (11)$$

$$Y'_3 = \frac{Y_1}{k} - \frac{1-k}{k} \cdot \rho_{PF} \cdot \sin\gamma \cdot \sin\beta$$

$$Z'_3 = \frac{Z_1}{k} - \frac{1-k}{k} \cdot \rho_{PF} \cdot \cos\gamma$$

Figure 6:
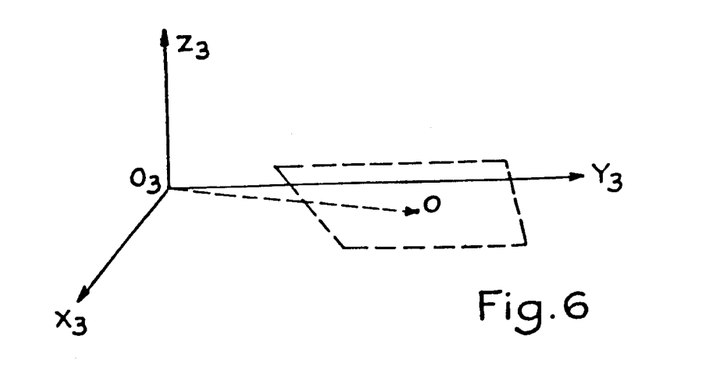

FIG. 6 represents the definitive transformed figure obtained as a result of a final transformation which is a translation, having a vector $\overrightarrow{O_3O}$, of the projected figure previously obtained. The coordinates of a point of the definitive transformed image are given by the following relation:

$$\begin{bmatrix} X_3 \\ Y_3 \\ Z_3 \end{bmatrix} = \begin{bmatrix} X'_3 \\ Y'_3 \\ Z'_3 \end{bmatrix} + \begin{bmatrix} X_{O3} \\ Y_{O3} \\ Z_{O3} \end{bmatrix} \quad (12)$$

where ($X_{O3}$, $Y_{O3}$, $Z_{O3}$) are the components of the translation vector $\overrightarrow{O_3O}$.

Relations (9) to (12) establish a relationship between the values of the coordinates (X, Y, Z) and ($X_3$, $Y_3$, $Z_3$) of a point of the initial image located in the movable reference frame and of a point of the transformed image located in the fixed reference frame. By reversing these relations, it is possible to determine the coordinates of a point of the initial image corresponding to a given point of the transformed image. These relations are as follows:

$$X = k\, D_{xx} \cdot (X_3 - X_{O3}) + D_{xy} \cdot (Y_3 - Y_{O3}) \quad (13)$$

$$Y = k\, D_{yx} \cdot (X_3 - X_{O3}) + D_{yy} \cdot (Y_3 - Y_{O3})$$

$$\frac{1}{k} = 1 - k_x \cdot (X_3 - X_{O3}) + k_y \cdot (Y_3 - Y_{O3})$$

with $$D_{xx} = \frac{\cos\alpha\cos\beta\cos\gamma + \sin\alpha\sin\beta}{Ax} \quad (14)$$

$$D_{xy} = \frac{\cos\alpha\sin\beta\cos\gamma + \sin\alpha\cos\beta}{Ay}$$

$$D_{yx} = -\frac{\sin\alpha\cos\beta\cos\gamma + \cos\alpha\sin\beta}{Ay}$$

$$D_{yy} = \frac{-\sin\alpha\sin\beta\cos\gamma + \cos\alpha\cos\beta}{Ay}$$

$$k_x = \frac{\cos\beta\sin\gamma}{\rho_{PF}}$$

$$k_y = \frac{\sin\beta\sin\gamma}{\rho_{PF}}$$

The application of the formulae (13) makes it necessary to compute the function of $X_3$ and $Y_3$, that is to say in respect of each point. This computation is a time-consuming operation since it entails the need for two multiplications in the general case. On the other hand, in the particular case in which the vanishing point recedes to infinity, $\rho_{PF}$ is therefore permanently infinite (k=1).

Relation (13) can be simplified and expressed in the form of a recurrence relation which is similar to that found in the absence of perspective effects:

$$X(X_3, Y_3) = X(X_3-1, Y_3) + D_{xx}$$

$$Y(X_3, Y_3) = Y(X_3-1, Y_3) + D_{yx} \quad (15)$$

In the case of the first point of each line, the recurrence relation is as follows:

$$X(O, Y_3) = X(O, Y_3-1) + D_{xy}$$

$$Y(O, Y_3) = Y(O, Y_3-1) + D_{yy} \quad (16)$$

In the case of the first point of an image, relation (13) gives the following values:

$$X(O, O) = -D_x \cdot X_{O3} - D_{xy} \cdot Y_{O3}$$

$$Y(O, O) = -D_{yx} \cdot X_{O3} - D_{yy} \cdot Y_{O3} \quad (17)$$

This simplification limits the possible effects of perspective but has the appreciable advantage of providing a transformation which is not more complicated to produce than a transformation without perspective effect since the recurrence formulae are of the same form. Current technology makes it possible to perform these calculations in real time.

The method in accordance with the invention is advantageous since it permits the possibility of generating the figure by storing a small quantity of data and permits geometrical transformation by means of calculations relating to the values of addresses of these data. For example, an initial image consisting of a square of the type shown in FIG. 2 makes it possible to obtain a transformed image comprising a lozenge having any desired dimensions, any desired position, and even a deformation which produces a perspective effect, this being achieved by storing only two tables which give the values of $|X|$ and $|Y|$ as a function of the values of X and Y. In this example, the figure can be represented by an equation of the form:

$$H(X, Y) = |X| + |Y| = \text{constant}.$$

This equation defines a family of squares centered on the origin and each value of the constant corresponds to a different square. Each point of the reference frame O, X, Y belongs to the interior or to the exterior of a given square, depending on whether the value H(X, Y) is lower than or higher than the value of the constant corresponding to the given square. In order to generate a video signal corresponding to a figure consisting of a square, it is only necessary to identify each point of the image to be obtained by means of cartesian coordinates ($X_3$, $Y_3$), to calculate in respect of each point the value of H(X, Y) as a function of $X_3$ and $Y_3$ by means of the formulae mentioned earlier, and then to compare this value with respect to the fixed constant which determines the square to be obtained. If the computed value is equal to the constant, the point considered belongs to the border of the square. If the computed value is lower than the constant, the point considered belongs to the interior of the square. And if the computed value is higher than the constant, the point considered belongs to the exterior of the square. It is then only necessary to initiate operation of a video signal switcher by means of a logical signal resulting from this comparison.

In order to determine the value of H(X, Y), the values X and Y are stored respectively in two tables, these two tables being addressed respectively by the values X and Y. The storage device is constituted by (a) these two tables, and (b) an adder for adding the values read respectively in each of these tables. The storage device is therefore not an image memory but a much less costly device consisting of two tables and of an adder.

Figures 7, 8, 9:
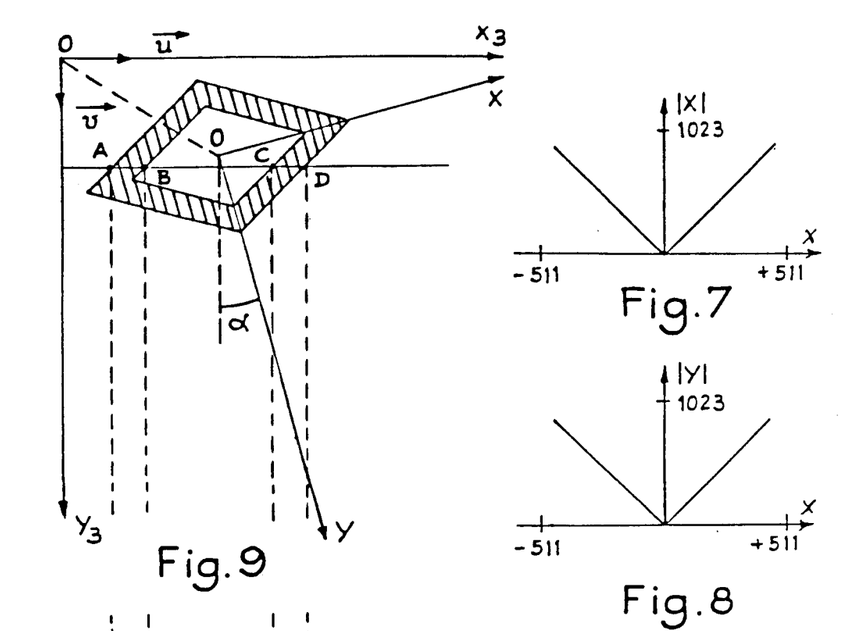

FIGS. 7 and 8 represent the graphs of the values contained in the tables in one example of construction for generating an initial image consisting of a square. Computations of addresses by means of the formulae mentioned earlier make it possible to obtain a lozenge having any desired dimensions and any desired position as well as a perspective effect if necessary. In FIGS. 7 and 8, the variables X and Y assume values within the range of −511 to +511, which means that each table stores 1024 words of 9 bits. The dimensions of the lozenge obtained in the transformed image can be modified on the one hand by producing an affine transformation but also by modifying the value of the constant with which the value of H(X, Y) is compared.

In the event that an electronic shape generator is employed in association with a variable-gain switcher in order to obtain an image in which a lozenge-shaped portion, for example, is supplied by a first video signal whereas another portion consisting of the background is supplied by a second video signal, it may be found desirable to produce a blurred transition at the edges of the lozenge.

Figure 10:
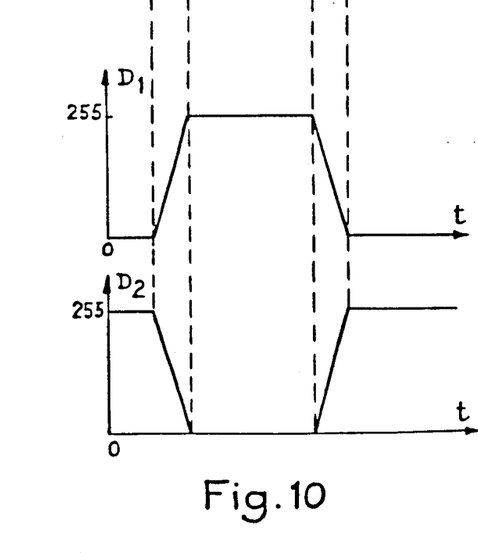
Figure 11:
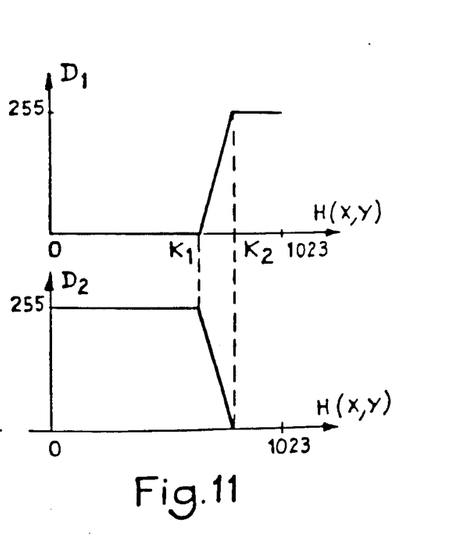

FIG. 9 represents a transformed image corresponding to the example just given. The shaded zone is a blurred zone obtained by adding the two video signals after they have been multiplied respectively by coefficients which vary in inverse ratio. These coefficients are proportional to digital values $D_1$ and $D_2$ supplied by two outputs of the electronic shape generator, these values being represented in FIG. 10 as a function of time and in FIG. 11 as a function of the value H(X, Y). The variations in the values $D_1$ and $D_2$ shown in FIG. 10 correspond to scanning of the line ABCD of the transformed image shown in FIG. 9. The points A, B, C, D are the points of intersection of this line with the boundaries of the blurred zone. While scanning of the segment AB is in progress, the value $D_1$ increases from 0 to 255 whereas the value $D_2$ decreases from 255 to 0 during the same period of time. While scanning of the segment CD is in progress, the value $D_1$ decreases from 255 to 0 whereas the value $D_2$ increases from 0 to 255. When it is not desired to produce a blurred transition, the value of H(X, Y) can be compared with the constant by means of a simple digital comparator. On the other hand, when it is necessary to produce a blurred transition, the comparator is replaced by a memory which supplies two digital values $D_1$ and $D_2$ in accordance with the graphs given in FIG. 11. The size of the lozenge and the width of the blurred border are determined by two constants $K_1$, $K_2$ such that: $0 < K_1 < K_2 < 1023$. When H(X, Y) varies from 0 to 1023, the value $D_1$ remains constant and equal to 0 when H(X, Y) $< K_1$. This value increases linearly to 255 when H(X, Y) varies from $K_1$ to $K_2$ and is then constant when H(X, Y) varies from $K_2$ to 1023. The value $D_2$ is constant and equal to 255 when H(X, Y) $< K_1$. This value then decreases linearly from 255 to 0 when H(X, Y) varies from $K_1$ to $K_2$, whereupon said value is constant and equal to 0 when H(X, Y) varies from $K_2$ to 1023.

Another effect can be obtained on the border of a figure and this effect consists in surrounding the pattern area formed by the lozenge with a colored border having a predetermined hue. In this case, the electronic shape generator is associated not only with a variable-gain switcher having two channels but also with a switching device for transmitting a video signal corresponding to the desired hue of the border. The electronic shape generator delivers three binary signals to these switching devices. A first signal assumes the value 0 when H(X, Y) $< K_2$ and the value 255 when H(X, Y) $> K_2$. A second signal assumes the value 255 when H(X, Y) $> K_2$ and assumes the value 0 when this is not the case. Finally, a third signal assumes the value 255 when $K_1 <$ H(X, Y) $< K_2$ and assumes the value 0 when this is not the case. The first signal permits transmission of the video signal corresponding to the background of the transformed image; the second signal permits transmission of the video signal corresponding to the interior of the pattern area; and the third signal permits transmission of the video signal for generating the desired hue of the border. These three signals can be generated either by a combination of digital comparators or by a memory which receives address values consisting of the values H(X, Y) and delivers the three binary signals on a data output.

The method in accordance with the invention is generally applicable to any figure which can be stored in a storage device, said device being addressable by the values of coordinates (X, Y) which identify the points of this figure in a cartesian reference frame. The storage of a figure in a device which is addressable by the coordinates X and Y is particularly simple when the equation of the figure can be resolved into a combination of one-dimensional functions as is the case with the equation $H(X, Y) = |X| + |Y| = $ constant. As a general rule, the storage device, which is not an image memory, entails the need for a low-capacity memory and contains a table of values for each one-dimensional function. Each point $(X_3, Y_3, 0)$ considered in the transformed image is represented by a binary word M obtained by reading in the tables the values of the functions which compose the equation at addresses which are functions of the address values X and Y applied to the storage device, then by computing the value of the equation from values read in the tables. This method is particularly simple to put into practice when the equation is of the form $F(X) + G(Y) = $ constant since it calls for the use of only two tables, namely one table which gives the values $F(X)$ as a function of the values of X whereas the other table gives the values of $G(Y)$ as a function of the values of Y. The values supplied by these two tables are added in order to determine the value of the equation and to obtain a value H(X, Y) representing the inclusion or non-inclusion of the point having coordinates (X, Y) of the initial image within the interior of the figure, depending on whether this value is lower than or higher than the value given to the constant in the equation which defines the figure.

Figure 12:
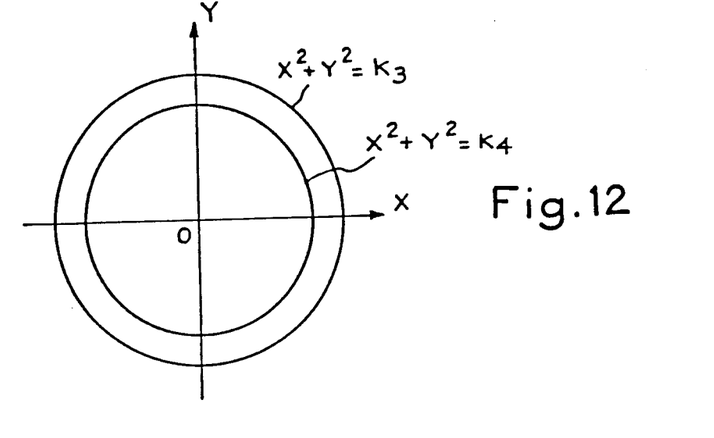
FIGS. 12 to 17 illustrate the method in accordance with the invention with other examples of generated figures.

FIG. 12 shows another example of figure which can be represented by an equation composed of two one-dimensional functions. In this example, the figure constituting the initial image is a circle centered on the origin 0 of the movable reference frame and corresponds to the equation $X^2 + Y^2 = $ constant. The geometrical transformations described in the foregoing make it possible to obtain in particular a pattern having the shape of an ellipse or a pattern having the shape of an ellipse deformed by an effect of perspective. In this example, the storage device comprises a memory in which is stored a table of values of $X^2$ as a function of the values of X and a table of the values of $Y^2$ as a function of the values of Y, and an adder.

Figure 13:
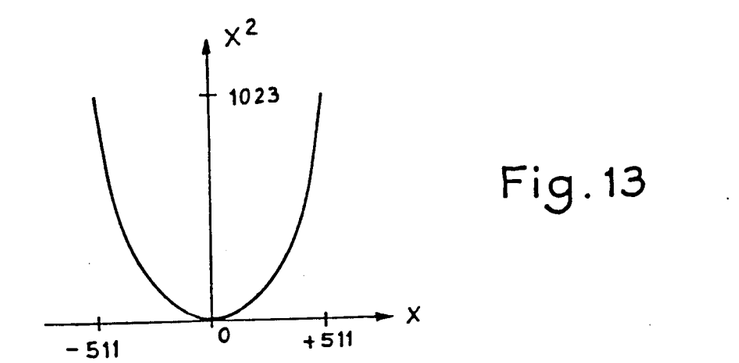
Figure 14:
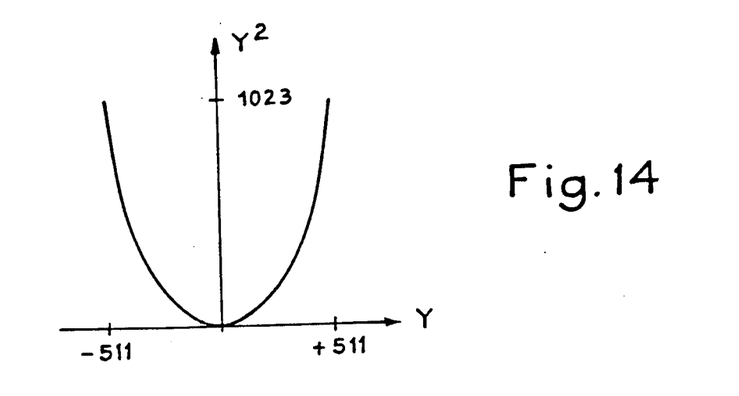

FIGS. 13 and 14 represent the graphs of the values contained in the two tables of the storage device for generating any desired circle irrespective of its diameter. The values X and Y vary between −511 and +511 whereas $X^2$ and $Y^2$ assume values within the range of 0 to 1023. The number of stored values is equal to 1024 in each of the tables, thus making it possible to generate a pattern whose edges have a highly uniform appearance. If the value $X^2 + Y^2$ is compared with constants $K_3$ and $K_4$ such that $K_3 \neq K_4$, the two corresponding figures are circles centered on 0 and having different radii. In this example, the value of the constant which defines the circle must be chosen so as to be close to 1023 in order to gain the benefit of higher uniformity of outline, a reduction in size of the circle being always possible by producing an affine transformation having a ratio which is smaller than 1. It would be possible to retain an affinity ratio equal to 1 and to reduce the size of the circle by adopting a low value for the constant with which the value of the equation is compared but, in that case, the figure thus obtained would be less uniform. Stairstep discontinuities would be more readily visible on the transformed image since the parabolas constituting the graphs of $X^2$ and $Y^2$ have a low slope in the vicinity of low values.

Figure 15:
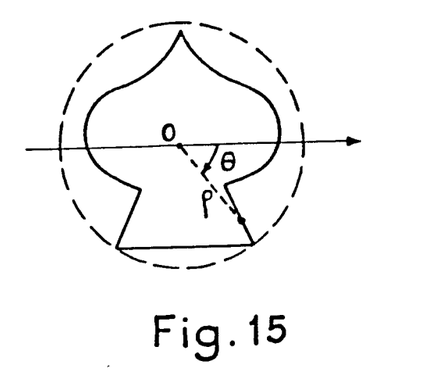
Figure 16:
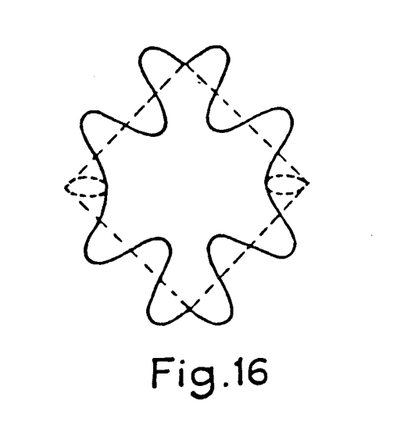

Certain figures do not have simple equations in cartesian coordinates and yet can readily be represented in polar coordinates ($\rho$, $\theta$). Examples of such figures are the ace of spades or else a lozenge having sinusoidal sides as shown respectively in FIGS. 15 and 16. The ace of spades can be considered as a circle modulated by a function of the angle $\theta$ whereas the lozenge having sides formed by sine waves having a period equal to twice the length of one side can be considered as a square having sides modulated by an orthogonal curve which is in fact a sine wave in this instance.

Broadly speaking, a geometrical figure which can be represented in polar coordinates ($\rho$, $\theta$) by an equation of the form $\rho(\theta).(1+g(\theta))=$constant can be considered as a circle whose radius is modulated by a function of $\theta$. The method of storage of the figure consists in storing seven tables containing respectively: the values of $X^2$, $Y^2$, $-\text{Log } X$, $\text{Log } Y$, as a function of (X, Y), the values of $\rho=\sqrt{X^2+Y^2}$ as a function of $X^2+Y^2$, the values of $\theta=\text{Arctg } Y/X$ as a function of Log X and of Log Y, and the values of $g(\theta)$ as a function of $\theta$. The method further consists in determining a binary word M by reading in the tables $X^2$, $Y^2$, $-\text{Log } X$, Log Y, then by computing $X^2+Y^2$ and $\text{Log } Y-\text{Log } X$, then by reading in the tables the value of $\rho=\sqrt{X^2+Y^2}$ and $\theta=\text{Arctg } Y/X$, then by reading in the tables $g(\theta)$, then by computing $\rho(\theta).(1+g(\theta))$. The value obtained is compared with respect to a constant which defines the size of the figure. If the value obtained is lower than the constant, the point having coordinates (X, Y) of the initial image is located inside the figure whereas it is located outside in the case of a higher value.

Similarly, it may be stated in general terms that a geometrical figure which can be represented by an equation of the form $(|X|+|Y|).(1+h(|X|-|Y|))=$ constant in cartesian coordinates (X, Y) can be considered as a figure deduced from a square by a modulation of the sides by an orthogonal curve. The method of storage of the figure accordingly consists in storing it in the form of seven tables containing respectively the values of $|X|$ as a function of the values of X, the values of $-|Y|$ as a function of the values of Y, and the values of $h(|X|-|Y|)$ as a function of the values of $(|X|-|Y|)$. The method further consists in restituting a predetermined binary word M in respect of each point of the initial image having coordinates (X, Y) by reading the values $|X|,|Y|, -|Y|$ in the tables, then by computing $|X|+|Y|$ and $|X|-|Y|$, then by reading $h(|X-|Y|)$ in the tables, then by computing:

$$M=(|X|+|Y|).(1+h(|X|-|Y|))$$

This value is then compared with the constant of the equation which defines the figure, the point (X, Y) being located inside the figure if the value of M is lower than the constant and being located outside the figure if the value M is higher than the constant.

These two methods of storage make it possible to produce very different figures by employing storage means comprising numerical tables which require a low memory capacity and comprise arithmetical operators: adders, subtracters, multipliers. A storage device of this type is in any case much less costly than an image memory.

Figure 17:
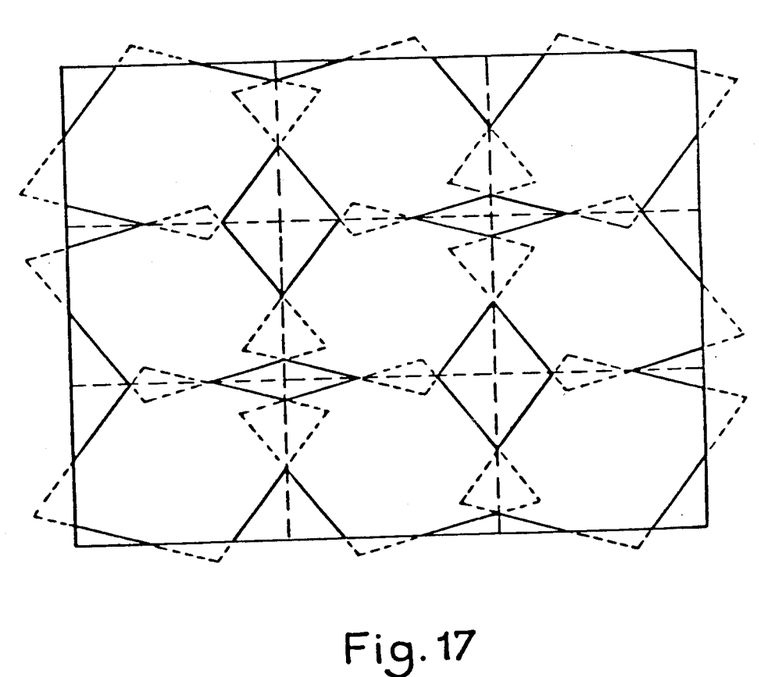

A particularly interesting and useful effect is the multiplication of patterns with or without mirror effect. FIG. 17 represents a transformed image obtained by multiplying a pattern three times horizontally and three times vertically. Each duplication of the pattern is achieved with a mirror effect, that is to say a symmetry with respect to one axis.

In order to produce an effect of horizontal multiplication of the initial image in the transformed image without a mirror effect, the method consists in reinitializing the value of the read addresses X and Y periodically during each line scan of the transformed image instead of continuing to apply the recurrence formulae (15) along the entire line. Reinitialization is carried out with values given by the formulae (16) exactly as in the case of the first point of the line. In this example, in order to obtain a multiplication by three in the horizontal direction, initialization of the value of X and Y must be performed at a frequency equal to three times the line scanning frequency.

In order to perform a vertical multiplication without mirror effect, the value of X and of Y is initialized periodically during a field scan by the values computed in accordance with the formulae (17) as in the case of the first point of a field. In this example of vertical multiplication by three, the frequency of these reinitializations in accordance with the formulae (17) is equal to three times the field frequency.

In order to obtain a mirror effect in addition to multiplication, the sign of the increments $D_{xx}$ and $D_{yx}$ is reversed at the time of each reinitialization by the values given by the formulae (16) in order to obtain symmetries with respect to vertical axes and the sign of the increments $D_{yy}$ and $D_{xy}$ is reversed at the time of each reinitialization with the values given by the formulae (17) in order to obtain symmetries with respect to horizontal axes.

Figure 18:
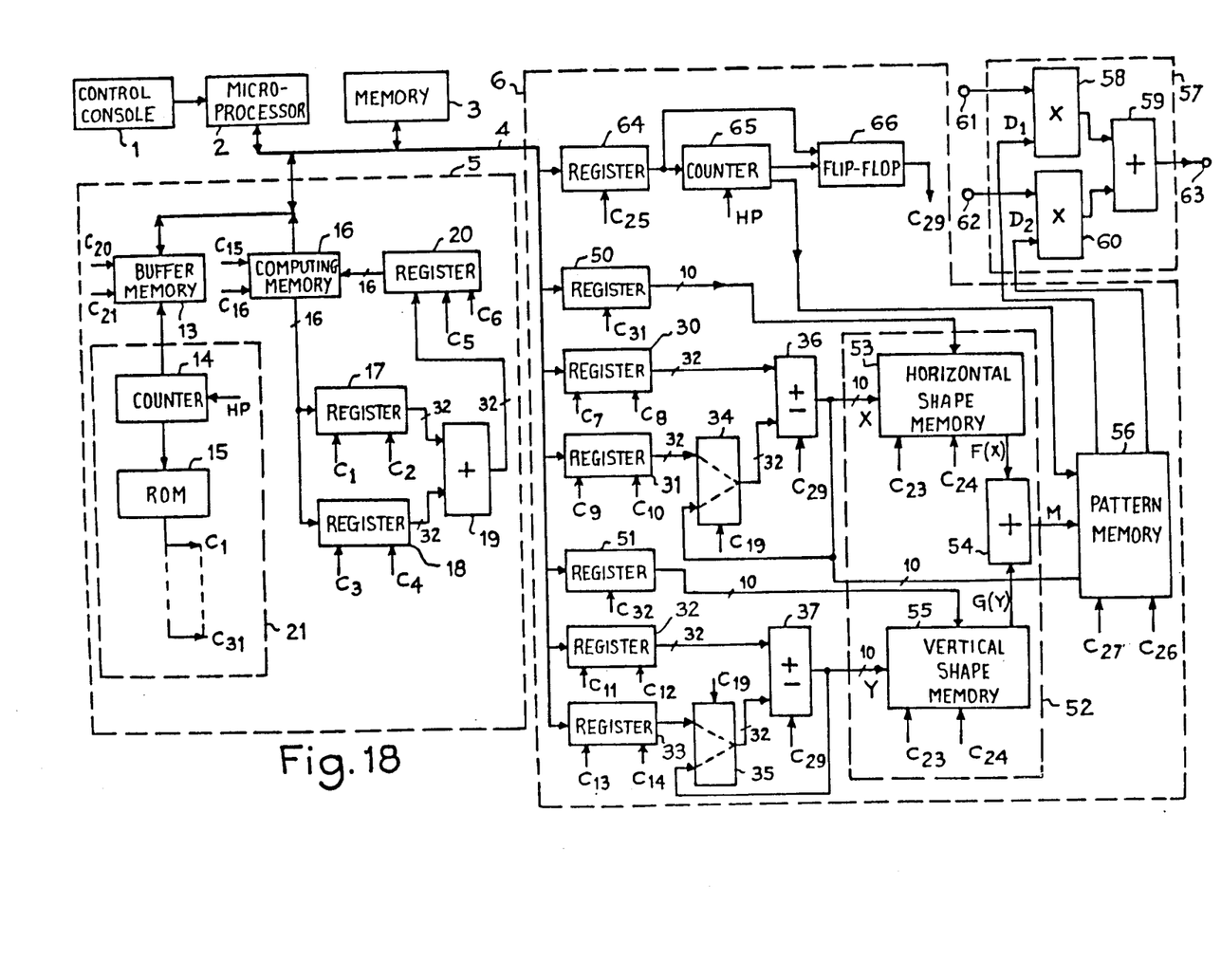
FIG. 18 is a block diagram showing an exemplified embodiment of the device in accordance with the invention.

FIG. 18 is a block diagram showing one example of construction of a device for carrying out the method in accordance with the invention in order to generate an image comprising a pattern area in which the equation is of the form $F(X)+G(Y)=$constant. This example of construction comprises a console 1 which enables an operator to control the device, a microprocessor 2, a memory 3, a data and address bus 4, a device 5 known as a line automaton because it operates at the line scanning frequency, a device 6 known as a point automaton since it operates at the point scanning frequency, and a variable-gain video switcher 57. This shape-generating device forms part of a video mixer comprising other devices such as a video inserter or inlay device, for example, all the devices of the mixer being controlled from the console 1 comprising a microprocessor connected to the bus 4. In the device considered, the microprocessor 2, the memory 3, the line automaton 5 and the point automaton 6 are connected to the bus 4. An operator controls the device by means of the console 1. The microprocessor 2 determines at the field frequency the initialization data which are necessary for operation of the line automaton 5 and the point automaton 6 as a function of the parameters chosen for the pattern, these parameters being stored in the memory 3 which is associated with the microprocessor 2. The memory 3 stores in particular data corresponding to predetermined effects which the operator initiates simply by depressing a key.

The line automaton 5 comprises a buffer memory 13, a computer memory 16, control means 21, three registers 17, 18 and 20, and an adder 19. The buffer memory 13 has a data input and an address input which are connected through the bus 4 to the microprocessor 2, and three inputs connected to the control means 21 for receiving a read address, a read control signal $C_{20}$, and a write control signal $C_{21}$.

The control means 21 comprise a counter 14 incremented by a clock signal HP at the frequency of the points, and a read-only memory (ROM) 15. The counter 14 delivers a read address to the memory 13 and a read address to the memory 14. This memory generates control signals $C_1$ to $C_{32}$ for initiating the operation of all the elements of the shape generator.

The variable-gain video switcher 57 is constituted by two multipliers 58 and 60, and by an adder 59. Said switcher receives on input terminals 61 and 62 two series of numerical (digital) values corresponding to two video signals and delivers on an output terminal 63 a series of numerical values of a video signal corresponding to an image constituted by part of the image provided by the first video signal and by part of the image provided by the second video signal. The first video signal is applied to the first input of the multiplier 58 which receives a numerical value $D_1$ on a second input. The second video signal is applied to a first input of the multiplier 60 which receives on a second input a numerical value $D_2$. The values supplied by the outputs of the multipliers 58 and 60 are added by the adder 59 and the resultant values constitute the values delivered to the output terminal 63.

The point automaton 6 comprises seven registers 64, 50, 30, 31, 51, 32, 33, a counter 65, a flip-flop 66, two multiplexers 34 and 35, two adder-subtracters 36 and 37, a device 52 for storing a figure, and a memory 56 known as a pattern memory. In this example, the figure can be represented by an equation of the for $F(X) + G(Y)$ = constant. The storage device 52 consists of a random-access memory (RAM) 53 or so-called horizontal shape memory for storing the values of $F(X)$ as a function of the values of X, a random-access memory (RAM) 55 or so-called vertical shape memory for storing the values of $G(Y)$ as a function of the values of Y, and an adder 54. All the registers have one input connected to the data and address bus 4. One output of the register 64 is connected to control and initialization inputs of the counter 65 and of the flip-flop 66. A control input of said register receives a control signal $C_{25}$ delivered by the control means 21 of the line automaton 5. The counter 65 has a clock input which receives a clock signal HP at the frequency of the points and has an output connected to a control input of the flip-flop 66. Said flip-flop 66 behaves as a scale-of-two frequency divider and delivers a control signal $C_{19}$ to a control input of the adder-subtracter 36 and to a control input of the adder-subtracter 37. The register 50 has a control input for receiving a signal $C_{31}$ delivered by the control means 21 and an output for supplying a ten-bit binary word to a data input of the horizontal shape memory 53. The register 51 has a control input for receiving a control signal $C_{32}$ delivered by the control means 21 and an output for supplying a ten-bit binary word to a data input of the vertical shape memory 55. The register 30 has two control inputs for receiving control signals $C_7$ and $C_8$ delivered by the control means 21 and has an output for supplying a 32-bit binary word to a first input of the adder-subtracter 36. The register 31 has two control inputs for receiving control signals $C_9$ and $C_{10}$ and has an output for supplying a 32-bit binary word to a first input of the multiplexer 34. A second input of the multiplexer 34 is connected to the output of the adder-subtracter 36 and its output is connected to a second input of said adder-subtracter. The multiplexers 34 and 35 are controlled by a control signal $C_{19}$ delivered by the control means 21.

The register 32 is controlled by control signals $C_{11}$ and $C_{12}$ and has an output for supplying a 32-bit binary word to a first input of the adder-subtracter 37. The register 33 is controlled by control signals $C_{13}$ and $C_{14}$ and has an output for supplying a 32-bit binary word to a first input of the multiplexer 35. The multiplexer 35 has a second input connected to the output of the adder-subtracter 37 and an output for supplying a 32-bit binary word to the second input of the adder-subtracter 37.

The operation of the adder-subtracters 36 and 37 either as adders or as subtracters is controlled by the control signal $C_{29}$ delivered by the flip-flop 66. The output of the adder-subtracter 36 supplies a 10-bit binary word to a read/write address input of the horizontal shape memory 53. The output of the adder-subtracter 37 supplies a 10-bit binary word to a read/write address input of the vertical shape memory 55. These ten bits are constituted by bits having weights within the range of $2^{10}$ to $2^{19}$ among the 32 bits delivered by the output of the adder-subtracters 36 and 37.

Reading and writing in the horizontal shape memory 53 and in the vertical shape memory 55 are controlled respectively by control signals $C_{23}$ and $C_{24}$. A data output of the memory 53 and a data output of the memory 55 are connected respectively to a first and a second input of the adder 54. The output of the adder 54 constitutes the output of the storage device 52 and supplies a binary word M. The binary word M is applied to a read address input of the pattern memory 56. The memory 56 also has a data input and a write address input which are connected respectively to the output of the adder-subtracter 36 and to the output of the counter 65, and two control inputs respectively for reading and for writing which receive control signals $C_{27}$ and $C_{26}$ delivered by the control means 21.

The control console 1 of the shape-generating device makes it possible to control a large number of effects and a large number of parameters for each effect: the number of the effect, its size, the horizontal framing, the vertical framing, the vertical or horizontal packing ratio, the angle of rotation, the width of a blurred border, the number of horizontal repetitions, the number of vertical repetitions, the mirror effect, the perspective effect, and so on. A microprocessor incorporated in the control console 1 transmits these parameters to the microprocessor 2 of the shape generator and the microprocessor 2 stores these parameters in the memory 3 and calls a program module for performing the initializations which are specific to the required effect. These initializations involve in particular the loading of the horizontal shape memory 53 and of the vertical shape memory 55. The data of memories 53 and 55 are stored in library form in the memory 3 since they are invariable in respect of a given effect. The microprocessor 2 computes initialization data enabling the point automaton 6 to compute the data of the pattern memory 56 as a function of the width of the border which is to be formed and which may be blurred. All these data are written into the buffer memory 13 of the line automaton 5 during each field scan under the control of the microprocessor 2. During each field blanking interval, these data are transferred via the bus 4 of the buffer memory 13 to the registers 64, 50, 30, 31, 51, 32, 33. Moreover, the buffer memory 13 delivers data for initialization of the line automaton 5, these data being loaded into the computing memory 16. Said initialization data are the address value X (0, 0), Y (0, 0), the values of the increments $k.D_{xy}$ and $k.D_{yy}$, the values of the addresses (X, Y) for the mirror effect or the repetition effect.

Reading of the buffer memory 13 is carried out during each field blanking interval at an address supplied by the output of the counter 14 under the control of the control signal $C_{21}$ delivered by the control means 21.

In the first place, the control means 21 effect the transfer from the buffer memory 13 to the register 30 and the data register 31 for enabling the adder-subtracter 36 to compute the data to be loaded into the pattern memory 56 in order to obtain a pattern having the desired size and having a blurred edge of the desired width. By way of example, the computed values are those given by the graphs in FIG. 11. At the beginning of this computation, the multiplexer 34 connects the output of the register 31 to the second input of the adder-subtracter 36, whereupon the multiplexer 34 connects the output of the adder-subtracter 36 to its second input under the control of the signal $C_{19}$ delivered by the control means 21.

Furthermore, the control means 21 initiate the transfer of data defining the shape of the pattern to be formed from the buffer memory 13 to the horizontal shape memory 53 and the vertical shape memory 55. These data are transferred respectively via the register 50 and via the register 51, then written into the memories 53 and 55 at addresses supplied respectively by the adder-subtracters 36 and 37 which compute a series of addresses within the range of 0 to 1023 from an initial value 0 stored in the register 31 and in the register 33 and from an increment value equal to unity stored in the register 30 and in the register 32. At the beginning of this computing operation, the multiplexers 34 and 35 are switched in order to connect respectively the register 31 and the register 33 to the second input of the adder-subtracter 36 and to the second input of the adder-subtracter 37.

Values of increments $k.D_{xx}$ and $k.D_{yy}$ are then transferred by the control means 21 from the buffer memory 13 to the registers 30 and 32 and values of addresses X(0, $Y_3$) and Y(0, $Y_3$) corresponding to the first point of the next field of the transformed image are transferred by said control means from said buffer memory to the registers 31 and 33.

During each line blanking interval, the control means 21 control the computing memory 16 and the registers 17, 18, 20 in order to compute the addresses corresponding to the first point of the following line. These address values are stored in the computing memory 16, then transmitted to the registers 30 and 32 via the bus 4.

In this example of construction, the storage means 52 make it possible to generate shapes described by an equation of the form $H(X, Y) = F(X) + G(Y)$. The binary word M supplied by the output of the adder 54 has the value H(X, Y). The pattern memory 56 is designed to deliver two control signals having values $D_1$ and $D_2$ for the purpose of forming blurred borders. Adaptation of the pattern memory to the formation of a colored border in accordance with the method set forth in the foregoing is within the capacity of any one versed in the art.

In this example, provision is made for the possibility of producing a multiplication of patterns with or without a mirror effect. The control means 21 carry out the loading of a binary word into the register 64 in order to control and initialize the counter 65 and the flip-flop 66 and thus to deliver a clock signal to the flip-flop 66 at the instants corresponding to the start of a pattern scan on each line. The flip-flop 66 then permits generation of the control signal $C_{29}$ which produces in alternate sequence an incrementation and a decrementation of the addresses supplied by the adder-subtracters 36 and 37 in order to obtain the mirror effect. In the event that the mirror effect is not desired, one output of the register 64 delivers to an inhibition input of the flip-flop 66 a signal for maintaining the control signal $C_{29}$ at a predetermined value which causes the adder-subtracters 36 and 37 to operate as adders.

Figure 19:
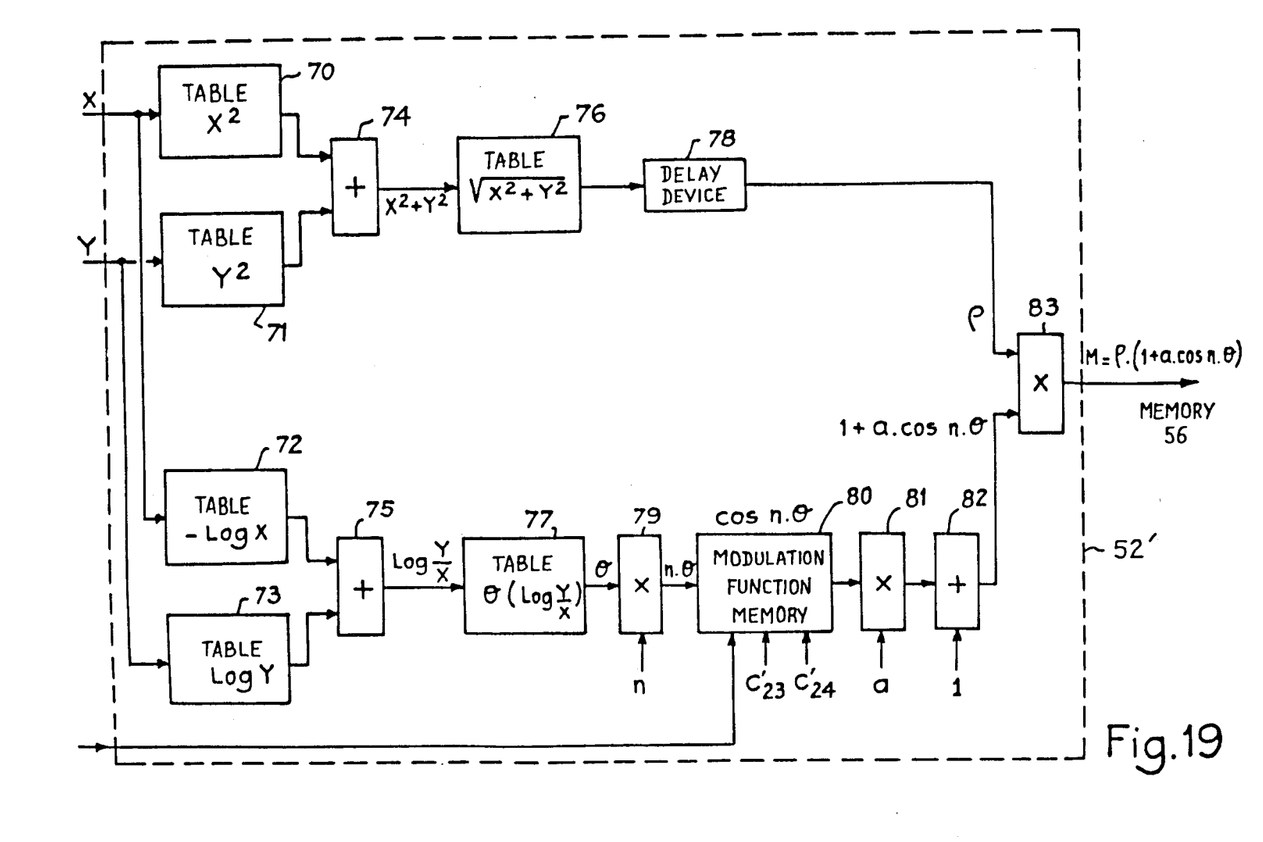
FIGS. 19 and 20 illustrate two variants of a portion of said exemplified embodiment.

FIG. 19 shows a variant 52' of the device 52 for storage of the initial image in order to generate a figure obtained by modulating the shape of a circle by a sine wave. In this example, an output of the device 52' supplies a binary word M whose value is equal to $p.(1+a.\cos n.\theta)$ when this device is addressed by address values x and y. This device 52 comprises six random-access memories 70, 71, 72, 73, 76 and 77 for storing the tables of the functions $X^2$, $Y^2$, Log Y, $-$Log X, $\sqrt{X^2+Y^2}$ and $\theta(\text{Log Y}/X)$, a random-access memory 80, three adders 74, 75 and 82, a delay device 78 and three multipliers 79, 81 and 83. The memories 70 and 72 receive a read address value consisting of the value X. The memories 71 and 73 receive a read address value consisting of the value Y. The memories 70 and 71 deliver respectively the values $X^2$ and $Y^2$ which are then added by the adder 74. The memories 72 and 73 deliver respectively a value $-$Log X and a value Log Y which are then added by the adder 75. The memory 76 receives a read address value consisting of the value $X^2+Y^2$ delivered by the output of the adder 74 and the memory 77 receives a read address value consisting of the value Log Y/X delivered by the output of the adder 75. The output of the memory 76 delivers a value $\rho = \sqrt{X^2+Y^2}$ to the delay device 78 which retransmits this value to a first input of the multiplier 83. The output of the memory 77 delivers a value $\theta = \text{Arctg Y}/X$ corresponding to the value of Log Y/X to a first input of the multiplier 79. This latter receives an integral value n on a second input and delivers a value $n\theta$ at its output. The value $n\theta$ constitutes a read address for the random-access memory 80. Said memory 80 is designated as a modulation function memory since it is previously loaded by the values of a function which is intended to modulate the shape of a circle. These values are loaded via a data input connected to the output of the register 50. Writing into and reading from the memory 80 are controlled respectively by the signal $C_{23}$ and the signal $C_{24}$ delivered by the control means 21 as in the case of the variant shown in FIG. 18. A data output of the memory 80 supplies a value cos $n\theta$ to a first input of the multiplier 81 which receives a constant a on a second input. The constant a determines the amplitude of modulation applied to the circle whereas the constant n determines the number of visible alternations on the modulated circle. The output of the multiplier 81 supplies a value a.cos nθ to a first input of the adder 82 which receives on a second input a constant value equal to unity. The output of the adder 82 therefore supplies a value 1+a.cos nθ to the second input of the multiplier 83. This latter delivers to a read address input of the pattern memory 56 a binary word M whose value is ρ.(1+a.cos nθ).

Figure 20:
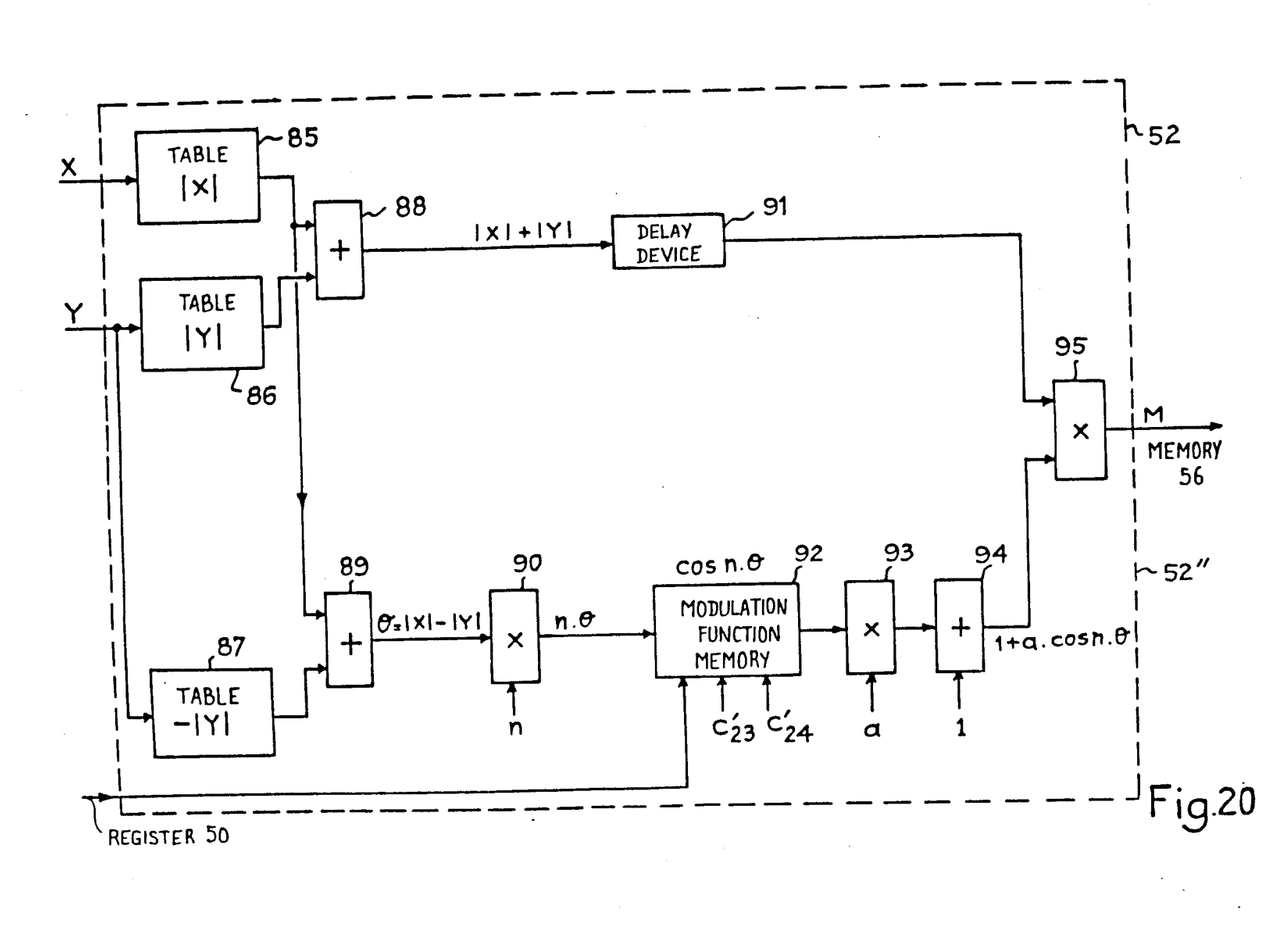

FIG. 20 represents a third variant 52″ of the device 52 of FIG. 18 which is adapted to generate a figure obtained by modulation of a square. In this example, the figure is described by an equation of the form:

$$(|X|+|Y|).(1+a\cos.n(|X|-|Y|))=\text{constant}$$

The device 52″ comprises three random-access memories 85, 86 and 87 which store respectively the tables of the values $|X|$, $|Y|$ and $-|Y|$, three adders 88, 89 and 94, a delay device 91, three multipliers 90, 93 and 95, and a random-access memory 92. The memory 85 receives a read address value consisting of the value X. The memories 86 and 87 receive a read address value consisting of the value Y. The data outputs of the memory 85 and of the memory 86 are connected respectively to the first and to the second input of the adder 88 which therefore delivers a value $|X|+|Y|$ at its output. The output of the memory 87 is connected to a first input of the adder 89, a second input of which is connected to the data output of the memory 85. The output of the adder 89 therefore supplies a value $\theta = |X|-|Y|$. The value θ is applied to a first input of the multiplier 90 which receives on a second input a constant integral value n. This value determines the number of alternations which modulate each side of the square. The output of the multiplier 90 supplies a value n.θ to a read address input of the random-access memory 92. This memory 92 is designated as a modulation function memory since it stores a table of the values of the function cos nθ as a function of nθ. These values are loaded at the time of initialization during the field blanking interval by means of the register 50 and under the control of the write control signal $C_{23}$. The value of cos nθ is read from the memory 92 at the address nθ under the action of the control signal $C_{24}$ and is then delivered to a first input of the multiplier 93. A second input of the multiplier 93 receives a constant value a which determines the amplitude of the modulation applied to the square. The output of the multiplier 93 delivers a value a.cos nθ to a first input of the adder 94 which receives a constant value equal to unity on a second input. The output of the adder 94 delivers a value 1+a.cos nθ to a first input of the multiplier 95. A second input of the multiplier 95 receives the value $|X|+|Y|$ delayed by the delay device 91 in order to compensate for the computing times of the multipliers 90, 93, of the memory 92 and of the adder 94. The output of the adder 95 supplies a binary word M whose value is equal to:

$$(|X|+|Y|).(1+a.\cos n(|X|-|Y|)).$$

The invention is not limited to the examples of construction described in the foregoing. It is possible in particular to construct electronic shape generators comprising a plurality of point automatons 6 designed in accordance with the three alternative embodiments described above and having outputs coupled by means of digital comparators. This in turn offers the possibility of combining the control signals for operating the variable-gain switchers in order to obtain two control signals for operating a variable-gain switcher. In consequence, the figures generated by the different point automatons of the shape generator can be superimposed in one and the same image.

Moreover, the invention is not limited to figures which can be represented by equations of the form $F(X)+G(Y)$ = constant or which are deduced from a circle or a square by a modulation. Thus the invention is in fact applicable to all figures which can be stored in a storage device, the address values of which are constituted by the coordinates of the points of an initial image in a cartesian reference frame.

What is claimed is:

1. A method for generating a video image comprising a geometrical figure which can be represented in a mobile cartesian coordinate system having (X, Y) coordinates by an equation of the form H(X, Y)=constant, composed of one-dimensional functions with a value of the constant defining the size of the figure, comprising the steps of:
   storing at least one table of values for each of the one-dimensional functions which compose the equation of the figure;
   determining cartesian coordinates X and Y corresponding to each imaged point of an image to be generated, in said mobile coordinate system;
   computing a value M=H(X, Y) for each point of the image as scanning of the image to be generated takes place, from values of the tables; and
   generating in respect of each of the image points a video signal which is a function oi the value M which has been computed for the image point in said computing step, this vlaue M representing the location of the image point, the location being inside the figure when M is less than the value of the constant defining the size of the figure and outside of the figure when M is greater than the value of the constant.

2. A method according to claim 1 in which the equation has separate variables and has a form H(X, Y)=F(X)+G(Y)=constant;
   and wherein said storing at least one table of values for each of the one-dimensional functions step includes the step of storing two tables which include respectively the values of F(X) and G(Y) at addresses constituted by cartesian coordinates X and Y respectively corresponding to the image point;
   and wherein said computing a value M =H(X, Y) step includes the step of reading values F(X) and G(Y) at addresses X and Y corresponding to the image point and calculating M=F(X)+G(Y).

3. A method according to claim 1 in which the geometrical figure is represented in said mobile cartesian coordinates system (X, Y) by an equation of the form $(|X|+|Y|).\{1+h(|X|-|Y|)\}$=constant, wherein h is a one-dimensional function;
   wherein said storing at least one table for the one-dimensional functions step includes storing seven tables including respectively:
   values $|X|$ as a function of values of X,
   values of $|Y|$ as a function of values of Y,
   values of $-|Y|$ as a function of values of Y, and
   values of $h(|X|-|Y|)$ as a function of values of $(|X|-|Y|)$;

and wherein said computing a value M=H(X, Y) for each image-point step includes the steps of:
reading $|X|$, $|Y|$, and $-|Y|$ from the tables at addresses X and Y corresponding to the image point;
computing $|X|+|Y|$ and $|X|-|Y|$;
reading $h(|X|-|Y|)$ from the tables; and
computing $M=(|X|+|Y|).(1+h(|X|-|Y|))$.

4. A method for generating a video image comprising a geometrical figure in which the geometrical figure is generated utilizing a mobile polar coordinates system $(\rho, \theta)$, where the geometrical figure can be represented by an equation of the form $\rho(\theta).(1+g(\theta))=$ constant, the value of the constant defining the size of the figure, and $g(\theta)$ being a one-dimensional function of $\theta$ comprising the steps of:
each value including respectively values:
$X^2$ as a function of X,
$(-\text{Log } X)$ as a function of X,
$Y^2$ as a function of Y,
Log Y as a function of Y,
values of $\rho = \sqrt{X^2+Y^2}$,
values of $\theta = \text{Arctg } Y/X$ as a function of Log Y/X, and
values of $g(\theta)$ as a function of $\theta$;
determining coordinates $\rho$ and $\theta$ corresponding to each imaged point of an image to be generated, in said mobile coordinate system;
computing a value $M=\rho(\theta).(1+g(\theta))$ for each point of the image as scanning of the image to be generated takes place, from values of the tables;
wherein said computing a value M=H(X, Y) for each image-point step includes the steps of:
(a) reading in the tables $X^2$, $Y^2$, $-\text{Log } X$, Log Y at addresses X and Y corresponding to the image point;
(b) computing $X^2+Y^2$ and Log Y − Log X;
(c) reading from the tables $\rho = \sqrt{X^2+Y^2}$, $\theta(\text{Log } Y/X)$, $g(\theta)$ at addresses $X^2+Y^2$, Log Y/X, and $\theta$ respectively; and
(d) computing $M=\rho(\theta).(1+g(\theta))x$; and
generating in respect of each of the image points a video signal which is a function of the value M which has been computed for the image point in siad computing step, this value M representing the location of the image point, the location being inside the figure when M is less than the value of the constant defining the size of the figure and outside the figure when M is greater than the value of the constant.

5. A shape generator for generating a geometrical figure in a video image, comprising:
means for storing at least one table of values of one-dimensional functions which function is represented by an equation H(X,Y)=constant which represents said figure in a mobile cartesian coordinates system (X,Y), the value of the constant defining the size of the figure;
means for determining the cartesian coordinates X and Y which correspond to each of a plurality of image points of an image to be generated in the mobile cartesian coordinates system;
means for computing a value M=H(X, Y) for each of the image points of the image from values read in the means for storing, as scanning of the image takes place;
means for comparing each value M to a value defining the size of the figure in the image to be generated and for supplying at least one signal which is a function of this comparison, in order to control at least one characteristic of a video signal.

6. A shape generator according to claim 5, wherein the geometrical figure can also be represented in the mobile cartesian coordinates system (X, Y) by an equation of the form $H(X,Y)=F(X)+G(Y)=$ constant,
wherein the storing means includes two memories for receiving respectively read addresses X and Y and delivering values F(X) and G(Y) respectively; and
wherein the means for computing includes an adder for receiving values F(X) and G(Y) supplied by the memories and for delivering a value $M=F(X)+G(Y)$.

7. A shape generator according to claim 5, wherein said geometrical figure can also be represented in the mobile cartesian coordinates system (X,Y) by an equation of the form: $H(X,Y)=(|X|+|Y|).\{1+a\cdot h'\{n.(|X|-|Y|)\}\}=$ constant, where a and n are constant, n is an integer and h' is a one-dimensional function, wherein the means for storing and the means for computing comprise:
first, second and third memory means for storing respectively values of $|X|$, $|Y|$ and $-|Y|$ as a function of values of X and Y respectively;
first adder means for receiving values of $|X|$ and $|Y|$ delivered by the first and the second memory means and for delivering a value of $|X|+|Y|$;
second adder means for receiving values of $|X|$ and $-|Y|$ delivered by the second and the third memory means and for delivering the vlaue of $\theta=|X|-|Y|$;
first multiplier means for multiplying by n the value of $\theta$ delivered by the second adder means;
fourth memory means for receiving a read address consisting of the value of $n\cdot\theta$ delivered by the first multiplier means and for storing values of the function $h'(n\cdot\theta)$ as a function of the value of $n\cdot\theta$;
second multiplier means for multiplying the value of $h'(n\cdot\theta)$ delivered by the fourth memory means by a;
third adder means for increasing by one unit the value of $a.h'(n.\theta)$ delivered by the second multiplier means;
wherein all of the memory means, adder means, and multifplier means have a computation time;
delay means for delaying the value of $|X|+|Y|$ delviered by the first adder means by a time interval equal to the computation time of the first and of the second multiplier means, of the fourth memory means and of the third adder means;
third multiplier means for multiplying value of $|X|+|Y|$ delayed by the delay device by the value of $1+a.h'(n.\theta)$ delivered by the third adder means and for delivering a value $M=(5l X|+|Y|).(1+a.h'(n.(|X|+|Y|)))$.

8. A shape generator for generating a geometrical figure in a video image comprising
means for storing at least one table of values of one-dimensional functions which functions are represented by an equation of the form $\rho.(1+a\cdot g'(n\cdot\theta))=$ constant, where b, a, and n are constants, n is an integer, and $g'(n\cdot\theta)$ is a one-dimensional function of $n\cdot\theta$, which represents said figure in a mobile polar coordinates system $(\rho, \theta)$, the value of the constant defining the size of the figure;
means for determining the polar coordinates $\rho$ and $\theta$ which correspond to each of a plurality of image points of an image to be generated in the mobile polar coordinates system;

wherein the storing means and the computing means comprise:

(a) first memory means for storing values of $X^2$ and $Y^2$ as a function of values of X and Y respectively;

(b) second memory means for storing values of $-\text{Log } X$ and $\text{Log } Y$ as a function of the values of X and Y respectively;

(c) first adder means, which is coupled to the outputs of the first memory means, for calculating a value of $X^2+Y^2$;

(d) second adder means, which is coupled to the outputs of the second memory means, for delivering a value $\text{Log } Y/X$;

(e) third memory means whose address input is coupled to the output of the first adder means, for storing values of $\rho=\sqrt{X^2+Y^2}$ as a function of values of $X^2+Y^2$;

(f) fourth memory means, whose address input is coupled to the output of the second adder, for storing values of $\theta=\text{Arctg } Y/X$ as a function of values of $\text{Log } Y/X$;

(g) first multiplier means formultiplying the value of $\theta$ delivered by the fourth memory means by n;

(h) fifth memory means, whose address input receives a value $n.\theta$ delivered by the first multiplier means, for storing values of $g'(n.\theta)$;

(i) second multiplier means for multiplying a value of $g'(n.\theta)$ delivered by the fifth memory means by the value a;

(j) third adder means for increasing by one unit the value of $a.g'(n.\theta)$ delivered by the second multiplier means;

wherein each of the above memory means, adder means and multiplier means have a computation time;

(k) delay means for delaying the value of $\rho$ delivered by the third memory means by a time interval equal to the computation time of the fourth memory means, of the fifth memory means, of the first and second adder means and of the second multiplier means; and (l) third multiplier means for multiplying a value of $\rho$ delayed by the delay device by the value of $1+a.g.'(n.\theta)$ delivered by the third adder means and for supplying a value $M=\rho.(1+a.g.'(n.\theta))$;

means for computing a value $M=\rho.(1+a,g.'(n.\theta))$ for each of the image points of the image from values read in the means for storing, as scanning of the image takes place;

means for comparing each value M to a value defining the size of the figure in the image to be generated and for supplying at least one signal which is a function of this comparison, in order to control at least one characteristic of a video signal.

* * * * *